United States Patent
Wu et al.

(10) Patent No.: US 12,407,443 B2
(45) Date of Patent: **\*Sep. 2, 2025**

(54) DATA PROCESSING METHOD AND DEVICE

(71) Applicant: Huawei Technologies Co., Ltd., Shenzhen (CN)

(72) Inventors: Xuming Wu, Wuhan (CN); Shiwei Nie, Dongguan (CN); Xu Wang, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/651,185

(22) Filed: Apr. 30, 2024

(65) Prior Publication Data

US 2024/0283566 A1 Aug. 22, 2024

Related U.S. Application Data

(63) Continuation of application No. 17/940,209, filed on Sep. 8, 2022, now Pat. No. 12,009,918, which is a
(Continued)

(30) Foreign Application Priority Data

Mar. 9, 2020 (CN) .......................... 202010157877.7

(51) Int. Cl.
*H04L 1/00* (2006.01)
*H04L 7/00* (2006.01)

(52) U.S. Cl.
CPC .......... *H04L 1/0045* (2013.01); *H04L 7/0075* (2013.01)

(58) Field of Classification Search
CPC ... H04L 1/0045; H04L 7/0075; H04L 1/0047; H04Q 2011/0064; H04Q 2011/0083;
(Continued)

(56) References Cited

U.S. PATENT DOCUMENTS 7,983,308 B1 * 7/2011 Johnston ............... H04J 3/0608
398/154
8,483,563 B2 7/2013 Luo et al.
(Continued)

FOREIGN PATENT DOCUMENTS

CN 101409708 A 4/2009
CN 104363531 A 2/2015
(Continued)

OTHER PUBLICATIONS

"IEEE Standard for Wireless Medium Access Control (MAC) and Physical Layer (PHY) Specifications for Peer Aware Communications (PAC)," in IEEE Std 802.15.8-2017 , vol. No., pp. 1-322, Feb. 7, 2018, (Year: 2018).*
(Continued)

*Primary Examiner* — Daniel F. McMahon
(74) *Attorney, Agent, or Firm* — Slater Matsil, LLP

(57) ABSTRACT

A data processing method and a device, the method including determining, by an optical network unit, in a received data stream, after the optical network unit enters a presynchronization state, a position of a forward error correction (FEC) codeword boundary in the data stream based on a position of a physical synchronization sequence (Psync) field, performing an FEC codeword decoding check, where the Psync field is a field that matches a preset Psync, in the data stream, and entering, by the optical network unit, a synchronization state in response to an FEC codeword among N consecutive FEC codewords in the data stream passing the decoding check, where N is an integer greater than or equal to 1.

20 Claims, 10 Drawing Sheets

Related U.S. Application Data continuation of application No. PCT/CN2020/132746, filed on Nov. 30, 2020.

(58) Field of Classification Search
CPC .......... H04Q 11/0067; H04Q 11/0062; H04Q 2011/0079; H04J 3/1694; H04J 14/0202
See application file for complete search history.

(56) References Cited

U.S. PATENT DOCUMENTS

| | | | |
|---|---|---|---|
| 8,620,157 | B2 | 12/2013 | Suvakovic |
| 9,178,713 | B1* | 11/2015 | Johnston ............... H04L 7/0075 |
| 10,855,397 | B2 | 12/2020 | Gao et al. |
| 2004/0208631 | A1 | 10/2004 | Song et al. |
| 2011/0142437 | A1* | 6/2011 | Luo ...................... H04J 3/0608 |
| | | | 398/1 |
| 2012/0321313 | A1* | 12/2012 | Jin ...................... H04L 1/0057 |
| | | | 398/66 |
| 2013/0272706 | A1 | 10/2013 | Luo et al. |
| 2021/0184771 | A1* | 6/2021 | Strobel .................... H04L 1/004 |
| 2021/0219033 | A1* | 7/2021 | Lefevre ................ H04L 1/0071 |
| 2023/0019473 | A1* | 1/2023 | Shen .................. H04Q 11/0071 |

FOREIGN PATENT DOCUMENTS

| | | |
|---|---|---|
| EP | 3447947 A1 | 2/2019 |
| JP | 5457553 B2 | 4/2014 |
| KR | 101696926 B1 | 1/2017 |
| WO | 2011050529 A1 | 5/2011 |
| WO | 2018014161 A1 | 1/2018 |
| WO | 2021194544 A1 | 9/2021 |

OTHER PUBLICATIONS

Schaefer, F.J. et al., "G.HSP: ONU Downstream Synchronization State Machine," Intel Corporation, Telecommunication Standardization Sector, Study Period 23017-2020, SG15-C, Mar. 24, 2020, 7 pages.

Shastri, B.J. et al., "Burst-Mode Clock and Data Recovery with FEC and Fast Phase Acquisition for Burst-Error Correction in GPONs," 2007 50th Midwest Symposium on Circuits and Systems, Montreal, 4 pages.

Shen, A. et al., "50G-PON Downstream Synchronization State Machine," Futurewei Technologies, Telecommunication Standardization Sector, Studay Period 2017-2020, Study Group 15, Apr. 20-24, 2020, 5 pages.

Shen, A. et al., "Downstream Synchronization Performance Comparison," Futurewei Technologies, ITU-T Draft; Study Period 2017-2020, Meeting: May 12, 2020, Q2 Call, 4 pages.

Wu, X. et al., "Appendix: ONU Synchronization State Machine," Source: Huawei Technologies Co., Ltd., ZTE Corporation, Purpose: Proposal, Telecommunication Standardization Sector, Study Period 2017-2020, SG15-C2180, Study Group 15, E-Meeting, Sep. 7-18, 2020, 5 pages.

* cited by examiner

DATA PROCESSING METHOD AND DEVICE

CROSS-REFERENCE TO RELATED APPLICATIONS

This application is a continuation of U.S. patent application Ser. No. 17/940,209, filed on Sep. 8, 2022, which is a continuation of International Application No. PCT/CN2020/132746, filed on Nov. 30, 2020, which claims priority to Chinese Patent Application No. 202010157877.7, filed on Mar. 9, 2020. All of the aforementioned patent applications are hereby incorporated by reference in their entireties.

TECHNICAL FIELD

This application relates to the field of data transmission technologies, and in particular, to a data processing method and a device.

BACKGROUND

A passive optical network (PON) includes an optical line terminal (OLT) on a central office side, an optical network unit (ONU) or an optical network terminal (ONT) on a user side, and an optical distribution network (ODN). The OLT provides a network-side interface to a PON system, and is connected to one or more ODNs. The ONU or the ONT provides a user-side interface to the PON system, and is connected to the ODN. The ODN is a network including an optical fiber and a passive optical splitter, and is used to connect the OLT and the ONU (the OLT and the ONU are collectively represented by the ONU hereinafter) to distribute or reuse a data signal between the OLT and the ONU. In the PON, a direction from the OLT to the ONU is referred to as downstream, and a direction from the ONU to the OLT is referred to as upstream.

In the PON system, when the OLT transmits downlink data to the ONU, the ONU usually needs to determine whether to enter a synchronization state. After the ONU enters the synchronization state, the ONU may parse data in a data frame. Currently, in a process of determining whether to enter the synchronization state, the ONU searches consecutive data streams for a specific synchronization sequence of a data frame header, and when finding the synchronization sequence and finding another synchronization sequence at an interval of a length of one data frame, may determine that the ONU can enter the synchronization state.

However, because each data frame has only one specific sequence, and duration of each data frame is relatively long, it usually takes a relatively long time to find at least two synchronization sequences in the consecutive data streams. As a result, it takes a relatively long time to enter the synchronization state.

SUMMARY

Embodiments of this application provide a data processing method and a device. The method includes whether to enter a pre-synchronization state is determined by verifying a physical synchronization sequence (Psync) and a superframe counter (SFC) in a data stream, after the pre-synchronization state is entered, a position of a forward error correction (FEC) codeword in the data stream is determined, and when the FEC codeword passes a decoding check, a synchronization state is entered. Because a plurality of FEC codewords are included between any two Psyncs in the data stream, whether to enter the synchronization state is determined by determining whether the FEC codeword passes decoding. Therefore, it can take a relatively short time to enter the synchronization state, and efficiency of entering the synchronization state can be improved.

A first aspect of this application provides a data processing method. The method may be applied to an optical network unit that receives a downlink data frame. The method includes the following steps. After the optical network unit enters a pre-synchronization state, the optical network unit determines, in a data stream, a position of an FEC codeword boundary in the data stream based on a position of a Psync field, and performs an FEC codeword decoding check, and if an FEC codeword among N consecutive FEC codewords in the data stream passes the decoding check, the optical network unit enters a synchronization state, where N is an integer greater than or equal to 1. In other words, after the optical network unit enters the pre-synchronization state, because the position of the Psync and a position of the FEC codeword are relatively fixed, the optical network unit may determine a boundary position of the FEC codeword based on the Psync, to determine the FEC codeword in the data stream, and finally, the optical network unit performs the decoding check on the FEC codeword, and when the FEC codeword among the N consecutive FEC codewords in the data stream passes the decoding check, enters the synchronization state from the pre-synchronization state, thereby quickly entering the synchronization state.

In this embodiment of this application, the optical network unit determines whether to enter the pre-synchronization state by verifying the Psync and an SFC in the data stream, determines the position of the FEC codeword in the data stream after entering the pre-synchronization state, and enters the synchronization state when the FEC codeword passes the decoding check. Because a plurality of FEC codewords are included between any two Psyncs in the data stream, whether to enter the synchronization state is determined by determining whether the FEC codeword passes decoding. Therefore, it can take a relatively short time to enter the synchronization state, and efficiency of entering the synchronization state can be improved.

In a possible implementation, the method further includes the optical network unit searches the received data stream for the field that matches the preset Psync, if the optical network unit finds, in the data stream, the Psync field that matches the preset Psync, the optical network unit verifies whether a first field having a preset quantity of bits and located after the Psync field constitutes a valid SFC structure, and if the first field constitutes the valid SFC structure, the optical network unit enters the pre-synchronization state.

In a possible implementation, after the optical network unit enters the pre-synchronization state and before the optical network unit enters the synchronization state, the method further includes the optical network unit determines, based on a position of the first field, an SFC field located after the first field in the data stream, and the optical network unit verifies the SFC field, where a verification result of the SFC field is that SFC verification succeeds. In other words, after the optical network unit enters the pre-synchronization state, in addition to performing the FEC codeword decoding check on the data stream, the optical network unit further needs to perform SFC verification, and after the FEC codeword decoding check is passed and the SFC verification succeeds, the optical network unit enters the synchronization state from the pre-synchronization state. Therefore, by further verifying whether the SFC field is valid, synchronization accuracy can be improved, and a probability of incorrect synchronization can be reduced.

In a possible implementation, the method further includes if no FEC codeword among the N consecutive FEC codewords in the data stream passes the decoding check, the optical network unit returns to a search state from the pre-synchronization state, where N is an integer greater than or equal to 1. In other words, if no FEC codeword among the N consecutive FEC codewords in the data stream passes the decoding check, it may be considered that the optical network unit incorrectly enters the pre-synchronization state, and the optical network unit may return to the search state from the pre-synchronization state, and re-search for a matched Psync field and an SFC field.

In a possible implementation, the method further includes after the optical network unit enters the synchronization state, if M consecutive FEC codewords in the data stream do not pass the decoding check, the optical network unit transitions from the synchronization state to a re-synchronization state, or if an FEC codeword among M consecutive FEC codewords in the data stream passes the decoding check, the optical network unit remains in the synchronization state, where M is an integer greater than or equal to 1. In other words, after the optical network unit enters the synchronization state, if none of the M consecutive FEC codewords in the data stream passes the decoding check, the optical network unit may incorrectly enter the synchronization state. Therefore, in this case, the optical network unit can enter the re-synchronization state to perform synchronization again, or if the FEC codeword among the M consecutive FEC codewords in the data stream passes the decoding check, the optical network unit may remain in the synchronization state.

In a possible implementation, the method further includes after the optical network unit enters the re-synchronization state, if an FEC codeword among S consecutive FEC codewords in the data stream passes the decoding check, the optical network unit transitions from the re-synchronization state to the synchronization state, where S is an integer greater than or equal to 1. In other words, after the optical network unit enters the re-synchronization state, the optical network unit may determine whether to reenter the synchronization state by performing the decoding check on the FEC codewords in the data stream, thereby avoiding incorrectly exiting the synchronization state due to a bit error in the data stream.

In a possible implementation, the method further includes after the optical network unit enters the re-synchronization state, if no FEC codeword among the S consecutive FEC from the re-synchronization state to a search state.

In a possible implementation, the method further includes the optical network unit decodes an FEC codeword in the data stream to obtain a decoded codeword payload, the optical network unit obtains a decoded Psync based on the decoded codeword payload, where the decoded Psync is located in the decoded codeword payload, if the decoded Psync matches the preset Psync, the optical network unit verifies whether a second field having a preset quantity of bits and located after the decoded Psync constitutes a valid SFC structure, and if the second field constitutes the valid SFC structure, the optical network unit enters the synchronization state from the pre-synchronization state, or remains in the synchronization state. In other words, when the Psync is located in the FEC codeword, after the optical network unit enters the pre-synchronization state, the optical network unit may further determine whether to enter the synchronization state by verifying the decoded Psync and verifying the SFC. This improves flexibility of solution implementation.

In a possible implementation, the method further includes after the optical network unit enters the synchronization state, if a decoded Psync does not match the preset Psync or SFC verification fails, the optical network unit transitions from the synchronization state to a re-synchronization state, or if a decoded Psync matches the preset Psync and SFC verification succeeds, the optical network unit remains in the synchronization state.

In a possible implementation, the method further includes after the optical network unit enters the re-synchronization state, for P consecutive data frames in the data stream, if a decoded Psync matches the preset Psync and SFC verification succeeds, the optical network unit transitions from the re-synchronization state to the synchronization state, where P is an integer greater than 1. In other words, after the optical network unit enters the re-synchronization state, if the decoded Psync is matched and the SFC verification succeeds, the optical network unit may transition from the re-synchronization state to the synchronization state.

In a possible implementation, the method further includes after the optical network unit enters the re-synchronization state, for each of the P consecutive data frames in the data stream, if a decoded synchronization sequence does not match the preset Psync or SFC verification fails, the optical network unit transitions from the re-synchronization state to a search state. In other words, after the optical network unit enters the re-synchronization state, if no decoded Psync is matched or no SFC is verified successfully in a plurality of consecutive data frames in the data stream, the optical network unit transitions from the re-synchronization state to the search state.

A second aspect of this application provides an optical network unit, including a processing unit, where the processing unit is configured to after entering a pre-synchronization state, determine, in a data stream, a position of an FEC codeword boundary in the data stream based on a position of a Psync field, and perform an FEC codeword decoding check, where the Psync field is a field that matches a preset Psync, in the data stream, and if an FEC codeword among N consecutive FEC codewords in the data stream passes the decoding check, enter a synchronization state, where N is an integer greater than or equal to 1.

In a possible implementation, the processing unit is further configured to search the received data stream for the field that matches the preset Psync, if finding, in the data stream, the Psync field that matches the preset Psync, verify whether a first field having a preset quantity of bits and located after the Psync field constitutes a valid SFC structure, and if the first field constitutes the valid SFC structure, enter the pre-synchronization state.

In a possible implementation, the processing unit is further configured to determine, based on a position of the first field, an SFC field located after the first field in the data stream, and verify the SFC field, where a verification result of the SFC field is that the SFC field constitutes the valid SFC structure.

In a possible implementation, the processing unit is further configured to if no FEC codeword among the N consecutive FEC codewords in the data stream passes the decoding check, return to a search state from the pre-synchronization state, where N is an integer greater than or equal to 1.

In a possible implementation, the processing unit is further configured to after entering the synchronization state, if M consecutive FEC codewords in the data stream do not pass the decoding check, transition from the synchronization state to a re-synchronization state, or if an FEC codeword among M consecutive FEC codewords in the data stream passes the decoding check, remain in the synchronization state, where M is an integer greater than or equal to 1.

In a possible implementation, the processing unit is further configured to after entering the re-synchronization state, if an FEC codeword among S consecutive FEC codewords in the data stream passes the decoding check, transition from the re-synchronization state to the synchronization state, where S is an integer greater than or equal to 1.

In a possible implementation, the processing unit is further configured to after entering the re-synchronization state, if no FEC codeword among the S consecutive FEC codewords in the data stream passes the decoding check, transition from the re-synchronization state to a search state.

In a possible implementation, the processing unit is further configured to decode an FEC codeword in the data stream to obtain a decoded codeword payload, obtain a decoded Psync based on the decoded codeword payload, where the decoded Psync is located in the decoded codeword payload, if the decoded Psync matches the preset Psync, verify whether a second field having a preset quantity of bits and located after the decoded Psync constitutes a valid SFC structure, and if the second field constitutes the valid SFC structure, enter the synchronization state from the pre-synchronization state, or remain in the synchronization state.

In a possible implementation, the processing unit is further configured to after entering the synchronization state, if a decoded Psync does not match the preset Psync or SFC verification fails, transition from the synchronization state to a re-synchronization state, or if a decoded Psync matches the preset Psync and SFC verification succeeds, remain in the synchronization state.

In a possible implementation, the processing unit is further configured to after entering the re-synchronization state, for P consecutive data frames in the data stream, if a decoded Psync matches the preset Psync and SFC verification succeeds, transition from the re-synchronization state to the synchronization state, where P is an integer greater than 1.

In a possible implementation, the processing unit is further configured to after entering the re-synchronization state, for each of the P consecutive data frames in the data stream, if a decoded synchronization sequence does not match the preset Psync or SFC verification fails, transition from the re-synchronization state to a search state.

A third aspect of this application provides an optical network unit, including a processor and a memory, where the memory stores operation instructions, and the processor reads the operation instructions in the memory to implement the method according to any one of the first aspect.

A fourth aspect of this application provides an optical network system, including an optical line terminal, an optical distribution network, and the optical network unit according to any one of the second aspect or the third aspect.

A fifth aspect of this application provides a computer program product including instructions, where when the instructions are run on a computer, the computer is enabled to perform the method according to any one of the first aspect or the second aspect.

A sixth aspect of this application provides a computer-readable storage medium including computer program instructions, where when the computer program instructions are run on a computer, the computer is enabled to perform the method according to any one of the first aspect or the second aspect.

It may be understood that the optical network unit provided in the second aspect, the optical network unit provided in the third aspect, the optical network system provided in the fourth aspect, the computer program product provided in the fifth aspect, and the computer-readable storage medium provided in the sixth aspect are all configured to perform the corresponding method provided above. Therefore, for beneficial effects that can be achieved, refer to beneficial effects in the corresponding method provided above. Details are not described herein again.

It can be learned from the foregoing technical solutions that the embodiments of this application have the following advantages.

In the embodiments of this application, after the pre-synchronization state is entered, the position of the FEC codeword in the data stream is determined, and the synchronization state is entered when the FEC codeword passes the decoding check. Because a plurality of FEC codewords are included between any two Psyncs in the data stream, whether to enter the synchronization state is determined by determining whether the FEC codeword passes decoding. Therefore, it can take a relatively short time to enter the synchronization state, and efficiency of entering the synchronization state can be improved.

DETAILED DESCRIPTION OF ILLUSTRATIVE EMBODIMENTS

To make objectives, technical solutions, and advantages of this application clearer, the following describes embodiments of this application with reference to accompanying drawings. It is clear that the described embodiments are merely some but not all of the embodiments of this application. A person of ordinary skill in the art may learn that, as a new application scenario emerges, the technical solutions provided in the embodiments of this application are also applicable to a similar technical problem.

In the specification, claims, and the accompanying drawings of this application, the terms "first", "second", and the like are intended to distinguish similar objects but do not necessarily indicate a specific order or sequence. It should be understood that data termed in such a way is interchangeable in proper circumstances, so that the embodiments described herein can be implemented in other orders than the order illustrated or described herein. In addition, terms "include" and "have" and any variations thereof are intended to cover non-exclusive inclusions, for example, a process, method, system, product, or device including a series of steps or modules need not be limited to those clearly listed steps or modules, but may include other steps or modules that are not clearly listed or are inherent to these processes, methods, products, or devices. Naming or numbering of steps in this application does not mean that the steps in the method procedures need to be performed in a time/logical order indicated by the naming or numbering. An execution order of the steps in the procedures that have been named or numbered can be changed based on a technical objective to be achieved, as long as same or similar technical effects can be achieved. Division into units in this application is logical division and may be other division in an actual implementation. For example, a plurality of units may be combined or integrated into another system, or some features may be ignored or not performed. In addition, the displayed or discussed mutual couplings or direct couplings or communication connections may be implemented through some interfaces. The indirect couplings or communication connections between the units may be implemented in electronic or other similar forms. This is not limited in this application. In addition, units or subunits described as separate parts may or may not be physically separate, may or may not be physical units, or may be distributed into a plurality of circuit units. Some or all of the units may be selected based on actual requirements to achieve the objectives of the solutions of this application.

Figure 1:
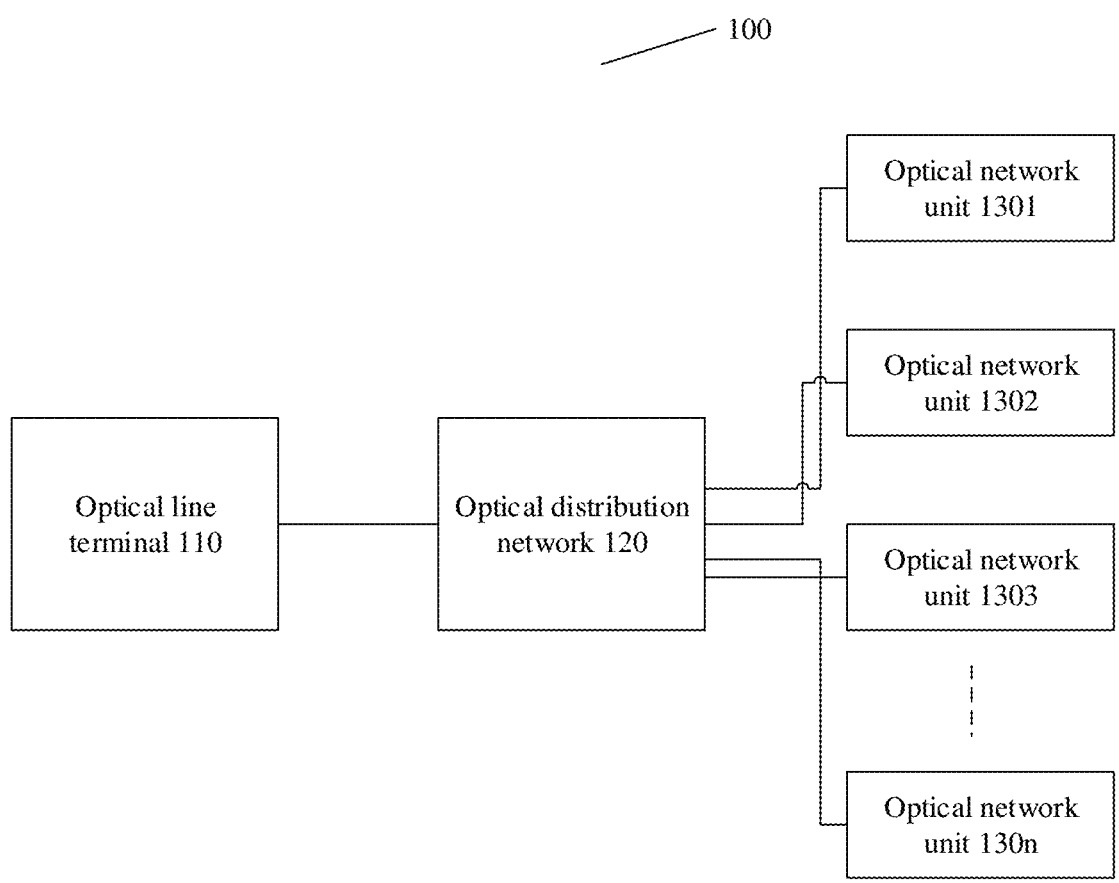
FIG. 1 is an exemplary diagram of a network architecture of a passive optical network according to an embodiment of this application.

With reference to FIG. 1, the following first describes an example of a network architecture of a passive optical network to which a data processing method shown in this application is applied.

As shown in FIG. 1, the passive optical network 100 shown in this embodiment includes one or more optical line terminals (OLTs) 110, an optical distribution network (ODN) 120, and a plurality of optical network units (ONUs).

The OLT 110 is connected to the plurality of ONUs in a point-to-multipoint manner by using the ODN 120. In this embodiment, an example in which the passive optical network 100 includes one OLT 101 is used for description. A specific quantity of ONUs is not limited in this embodiment, provided that there are a plurality of ONUs. For example, the passive optical network shown in this embodiment includes n ONUs, that is, an ONU 1301, an ONU 1302, . . . , an ONU 130n.

To better describe a communication process of uplink and downlink service data shown in this application, a direction from the OLT 110 to the ONU shown in this application is defined as a downlink direction, and a direction from the ONU to the OLT 101 is defined as an uplink direction.

The passive optical network may be a communications network that does not require any active component to implement communication between the OLT 110 and the ONU 1301, the ONU 1302, . . . , the ONU 130n. Specifically, communication between the OLT 110 and the ONU 1301, the ONU 1302, . . . , the ONU 130n may be implemented by using a passive optical component in the ODN 120, where the passive optical component includes but is not limited to an optical splitter or a multiplexer.

The OLT 110 is usually located in a central office (central office, CO). The OLT 110 may manage the ONU 1301, the ONU 1302, . . . , the ONU 130n in a unified manner. The OLT 110 may serve as a medium between the ONU 1301, the ONU 1302, . . . , the ONU 130n and an upper layer network. For example, in the downlink direction, the OLT 110 forwards data received from the upper layer network to the ONU 1301, the ONU 1302, . . . , the ONU 130n as downlink service data by using a downlink wavelength channel. For another example, in the uplink direction, the OLT 110 forwards uplink service data received from the ONU 1301, the ONU 1302, . . . , the ONU 130n to the upper layer network by using an uplink wavelength channel.

The ODN 120 may be a data distribution system. The ODN 120 may include an optical fiber, an optical coupler, an optical splitter, an optical multiplexer, and/or other devices. In an embodiment, the optical fiber, the optical coupler, the optical splitter, the optical multiplexer, and/or the other devices may be passive optical components. Specifically, the optical fiber, the optical coupler, the optical splitter, the optical multiplexer, and/or the other devices may be components that distribute data signals between the OLT 110 and the ONU 1301, the ONU 1302, . . . , the ONU 130n without power supply support. In addition, in other embodiments, the ODN 120 may further include one or more processing devices, for example, an optical amplifier or a relay device. Specifically, the ODN 120 may extend from the OLT 110 to a plurality of ONUs such as the ONU 1301, the ONU 1302, . . . , the ONU 130n, but may also be configured as any other point-to-multipoint structure. This is not specifically limited in this embodiment.

The ONU 1301, the ONU 1302, . . . , the ONU 130n may be disposed at user-side locations (for example, customer premises) in a distributed manner. The ONU 1301, the ONU 1302, . . . , the ONU 130n may be network devices configured to communicate with the OLT 110 and users. Specifically, the ONU 1301, the ONU 1302, . . . , the ONU 130n may serve as a medium between the OLT 110 and the users. For example, the ONU 1301, the ONU 1302, . . . , the ONU 130n may forward downlink service data received from the OLT 110 to the users, and forward data received from the users to the OLT 110 as uplink service data.

Figure 2A:
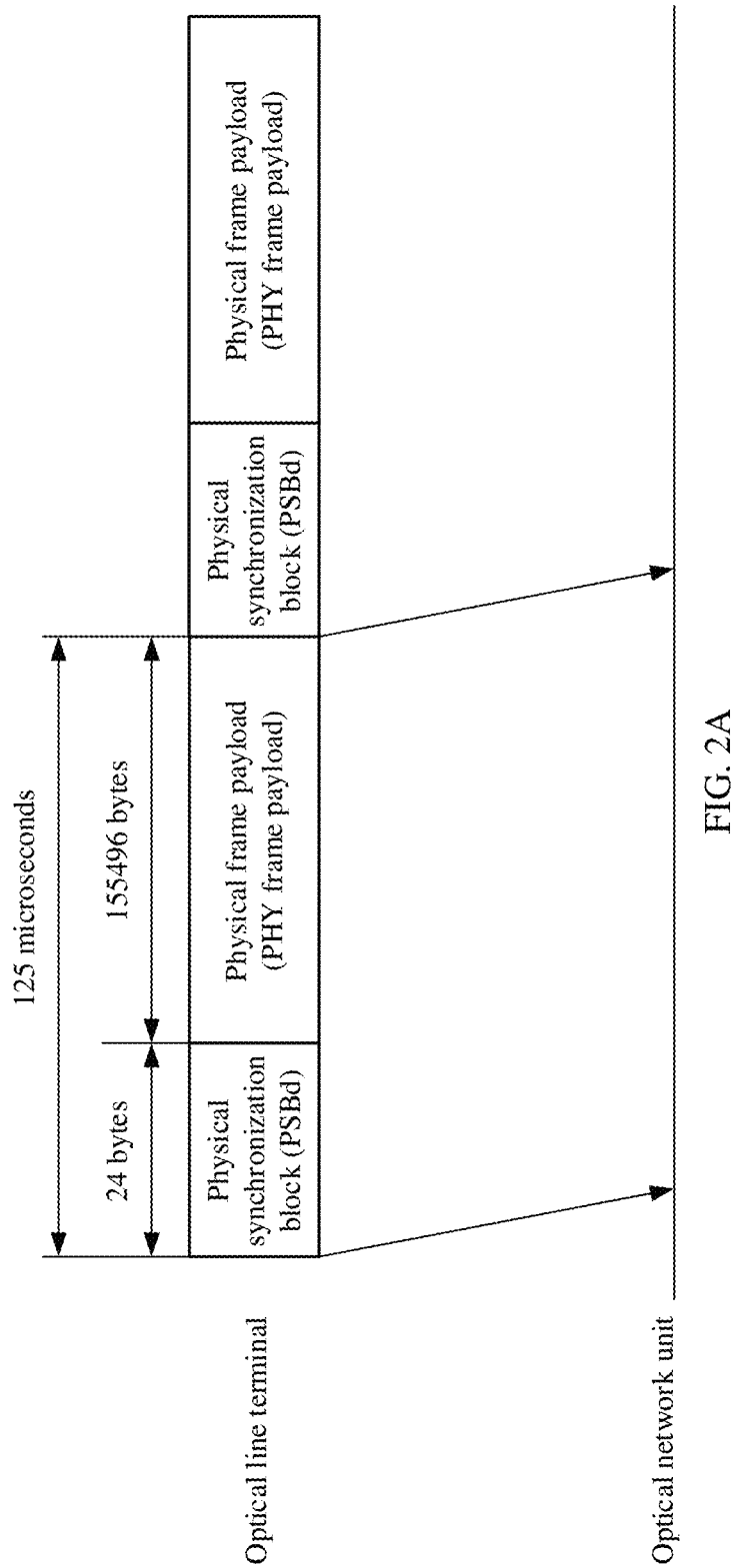
FIG. 2A is an exemplary schematic diagram of a structure of a downlink data frame according to an embodiment of this application.
Figure 2B:
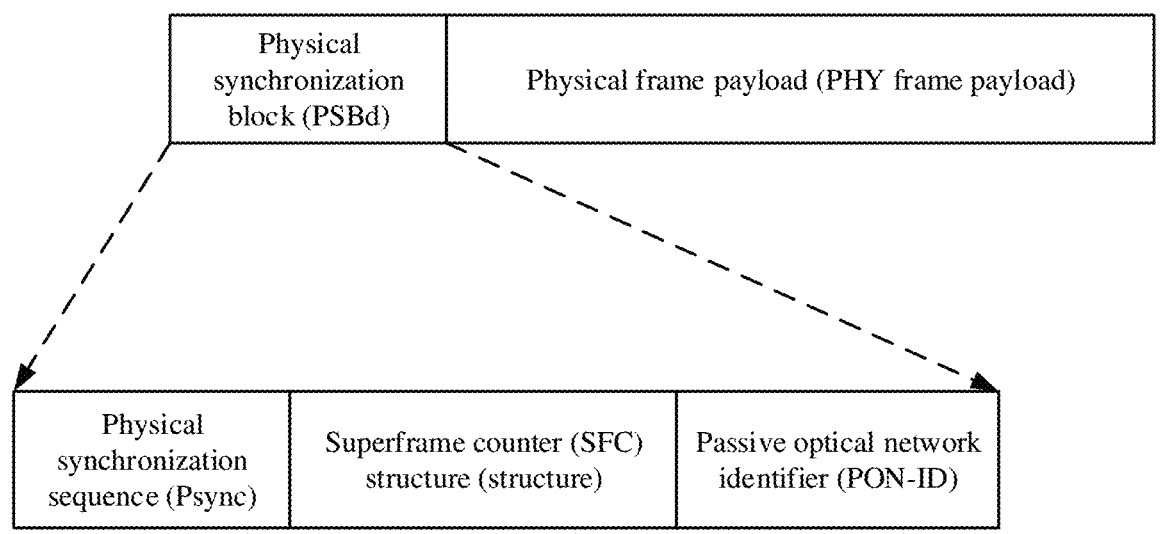
FIG. 2B is another exemplary schematic diagram of a structure of a downlink data frame according to an embodiment of this application.

Currently, in a PON system, when an OLT transmits downlink data to an ONU, the ONU usually needs to delimit a downlink data frame. After the ONU completes the downlink data frame delimitation, the ONU may parse the data in the data frame. A 10G PON system with a 10 Gbit/s downlink rate and a 2.5 Gbit/s or 10 Gbit/s uplink rate is used as an example. As shown in FIG. 2A, in a 10G PON system, downlink data is usually in units of 125 microseconds, and data in every 125 microseconds constitutes one complete downlink data frame. There is a 24-byte downstream physical synchronization block (PSBd) in a header of the downlink data frame. As shown in FIG. 2B, the PSBd includes a Psync, an SFC structure, and a passive optical network identifier (PON-ID).

In a process of delimiting a downlink data frame, an ONU needs to search consecutive data streams for a Psync, and then verify, after finding the Psync, whether an SFC is correct. After both the Psync and the SFC are verified successfully, the ONU enters a pre-synchronization state. If the ONU finds a Psync and an SFC that recur at an interval of a length of one or more downlink data frames in a data stream, the ONU enters a synchronization state from the pre-synchronization state. In other words, the ONU can enter the synchronization state only when the ONU finds at least two PSBds in the consecutive data streams, and both Psyncs and SFCs in two PSBds are verified successfully. Apparently, because each data frame has only one PSBd, and duration of each data frame is fixed (for example, 125 microseconds), efficiency of a current frame delimitation manner is relatively low, and it needs to take a relatively long time to enter the synchronization state.

In addition, in some PON systems with relatively high bit error rates (for example, a high-speed PON system), bit error rates of a Psync and an SFC are high, and once there is a bit error in the Psync or the SFC, it may be difficult for the ONU to find a matched Psync and SFC within a short time. Consequently, entering the synchronization state is postponed.

In view of this, an embodiment of this application provides a data processing method. Whether to enter a pre-synchronization state is determined by verifying a Psync and an SFC in a data stream, after the pre-synchronization state is entered, a position of an FEC codeword in the data stream is determined, and when the FEC codeword passes a decoding check, a synchronization state is entered. Because a plurality of FEC codewords are included between any two Psyncs in the data stream, whether to enter the synchronization state is determined by determining whether the FEC codeword passes decoding. Therefore, it can take a relatively short time to enter the synchronization state, and efficiency of entering the synchronization state can be improved.

It should be noted that the data processing method provided in this embodiment of this application may be applied to PON systems with various speeds, for example, a 10G PON system or a high-speed PON system. The high-speed PON system may be a 50G PON system or a higher-speed PON system. This is not specifically limited herein.

The data processing method provided in this embodiment of this application may be applied to downlink data frame delimitation, that is, an ONU determines a boundary position in a downlink data frame. The data processing method may alternatively be applied to uplink data frame delimitation, that is, an OLT determines a boundary position in an uplink data frame. For ease of description, the following describes in detail the data processing method provided in this embodiment of this application by using an example in which the data processing method is applied to downlink data frame delimitation.

In addition, the data processing method provided in this embodiment of this application may be applied to processing of downlink data of different frame structures. Specifically, a frame structure of downlink data may include the following two cases.

1. A PSBd is not in an FEC Codeword.

In a downlink data stream, the downlink data stream includes consecutive downlink data frames, and each downlink data frame includes a plurality of FEC codewords. A PSBd is located at a frame header position of each downlink data frame, and the PSBd is located outside an FEC codeword.

Figure 3A:
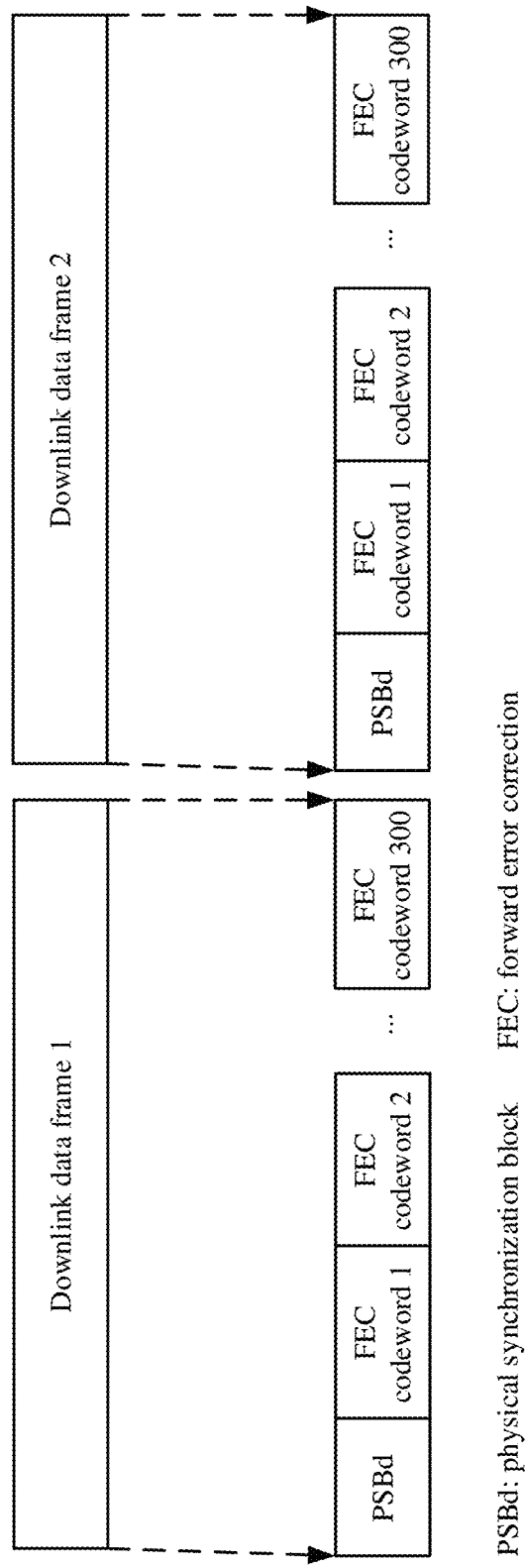
FIG. 3A is a schematic diagram of a structure of a downlink data frame according to an embodiment of this application.

FIG. 3A is a schematic diagram of a structure of a downlink data frame according to an embodiment of this application. A downlink data frame 1 and a downlink data frame 2 are two consecutive downlink data frames. Both the downlink data frame 1 and the downlink data frame 2 include 300 FEC codewords (that is, an FEC codeword 1 to an FEC codeword 300), and there is a PSBd at a frame header position of the downlink data frame, that is, the PSBd is located before a first FEC codeword, and the PSBd is not in the FEC codeword.

2. A PSBd is in an FEC Codeword.

In a downlink data stream, the downlink data stream includes consecutive downlink data frames, and each downlink data frame includes a plurality of FEC codewords. A PSBd is located at a frame header position of each downlink data frame, and the PSBd is located in a first FEC codeword of the downlink data frame.

Figure 3B:
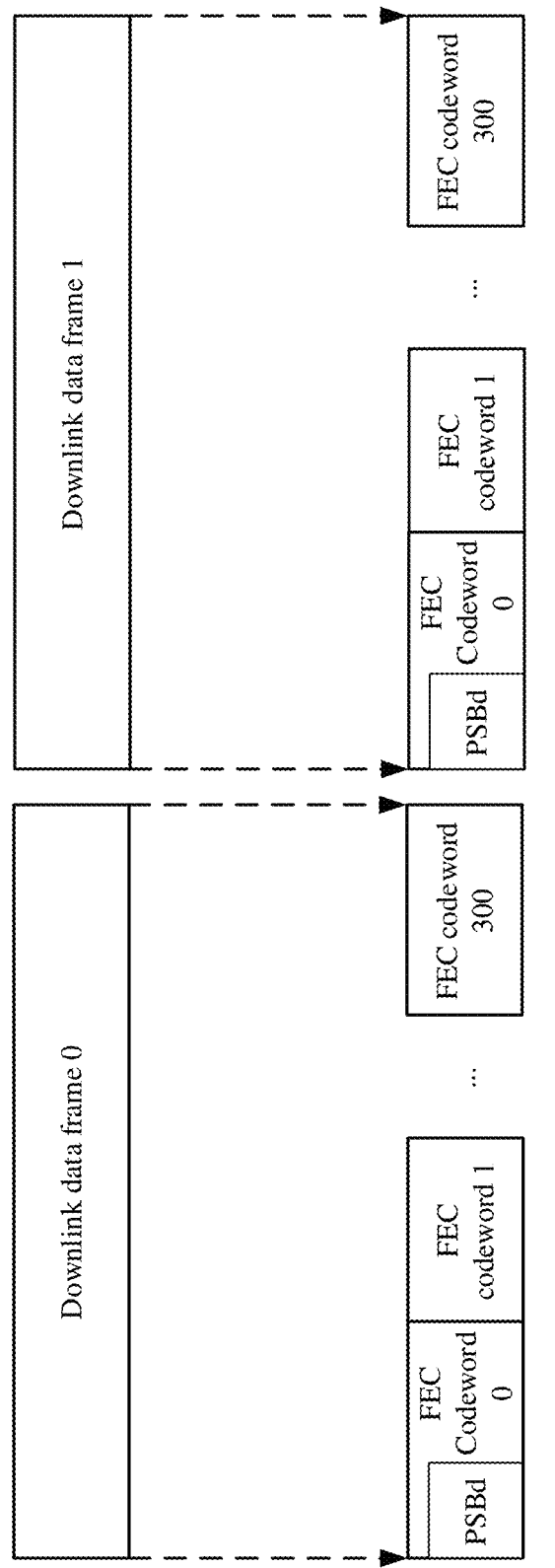
FIG. 3B is a schematic diagram of another structure of a downlink data frame according to an embodiment of this application.

FIG. 3B is a schematic diagram of another structure of a downlink data frame according to an embodiment of this application. A downlink data frame 1 and a downlink data frame 2 are two consecutive downlink data frames. Both the downlink data frame 1 and the downlink data frame 2 include 300 FEC codewords (that is, an FEC codeword 1 to an FEC codeword 300), and a first FEC codeword of the downlink data frame includes one PSBd, that is, the PSBd is located in the first FEC codeword.

Figure 4:
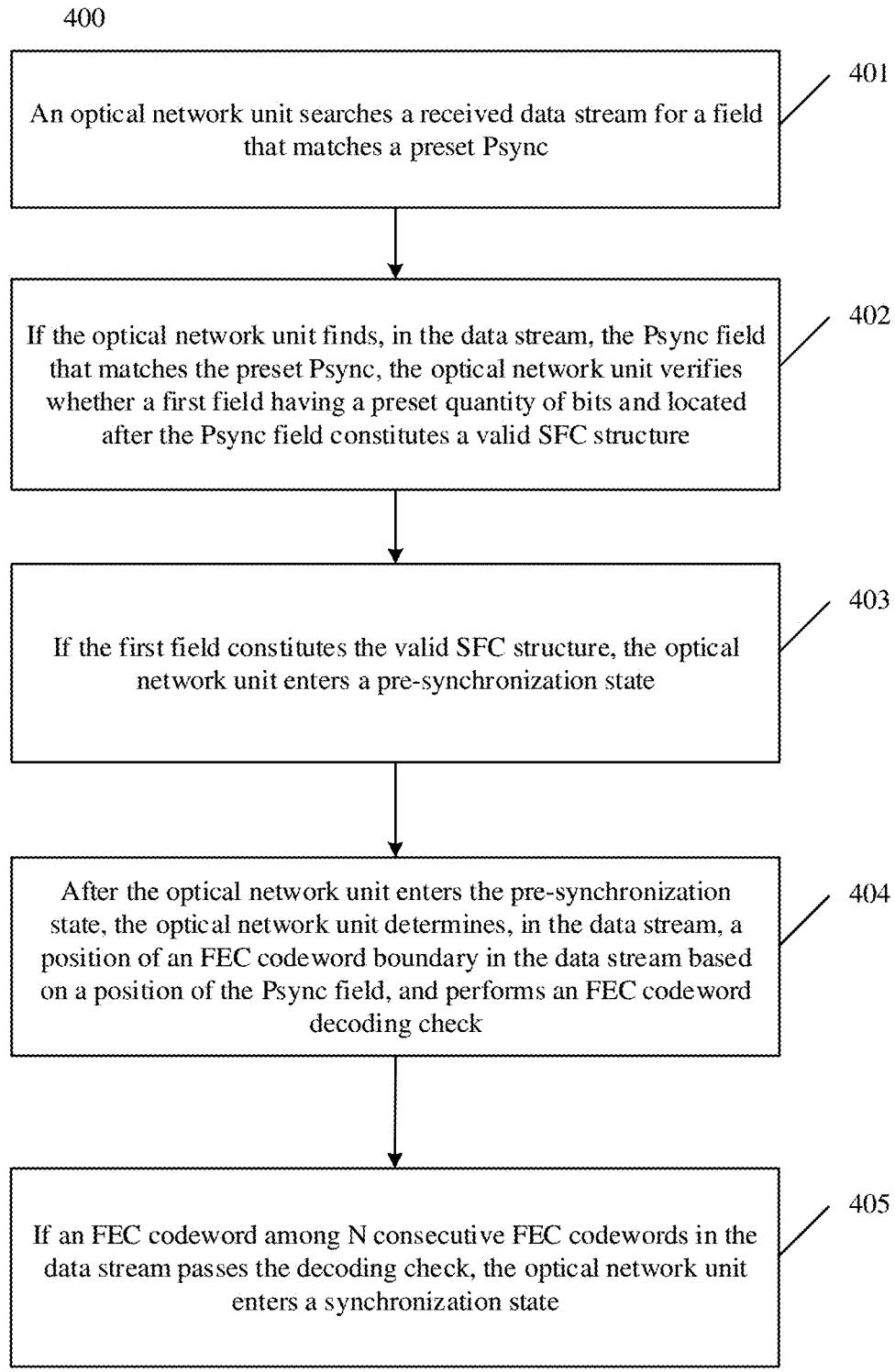
FIG. 4 is a schematic flowchart of a data processing method 400 according to an embodiment of this application.

FIG. 4 is a schematic flowchart of a data processing method 400 according to an embodiment of this application. As shown in FIG. 4, the data processing method 400 provided in this embodiment of this application includes the following steps.

401. An optical network unit searches a received data stream for a field that matches a preset Psync.

After the optical network unit is started, the optical network unit enters a search state, that is, the optical network unit searches the received data stream for the field that matches the preset Psync. The preset Psync may be a preset specific sequence. In the data stream, the preset Psync is a specific sequence used to implement downlink data frame synchronization.

402. If the optical network unit finds, in the data stream, the Psync field that matches the preset Psync, the optical network unit verifies whether a first field having a preset quantity of bits and located after the Psync field constitutes a valid SFC structure.

If the optical network unit finds, in the data stream, a field that is the same as the preset Psync, it may be considered that the optical network unit finds, in the data stream, the Psync field that matches the preset Psync, and the optical network unit may continue to verify whether the first field located after the Psync field constitutes the valid SFC structure. The first field may be a field having the preset quantity of bits and located after the Psync field. For example, when an SFC is 64 bits, the first field may be, for example, a 64-bit field located after the Psync field. Simply, the quantity of bits of the first field is the same as a quantity of bits of the SFC.

403. If the first field constitutes the valid SFC structure, the optical network unit enters a pre-synchronization state.

If the first field located after the Psync field constitutes the valid SFC structure, it may be considered that the optical network unit finds a PSBd located at a frame header position of a downlink data frame, and the optical network unit may enter the pre-synchronization state. The pre-synchronization state is a state entered before the optical network unit enters a synchronization state. In the pre-synchronization state, the optical network unit may continue to perform further detection on the data stream, so that the optical network unit can transition from the pre-synchronization state to the synchronization state or return to the search state from the pre-synchronization state.

Conversely, if the first field located after the Psync field does not constitute the valid SFC structure, it may be considered that the Psync field found by the optical network unit and matching the preset Psync is not a Psync in the PSBd, but may be caused by bit errors of other data in the downlink data stream, that is, due to bit errors, some data bits in the downlink data stream become a Psync field matching the preset Psync. Therefore, the optical network unit continues to perform step 401, that is, continues to search for a field matching the preset Psync.

404. After the optical network unit enters the pre-synchronization state, the optical network unit determines, in the data stream, a position of an FEC codeword boundary in the data stream based on a position of the Psync field, and performs an FEC codeword decoding check.

In this embodiment, the PSBd is located at the frame header position of the data frame in the downlink data stream, and an FEC codeword is located after the PSBd. Therefore, after the Psync field in the PSBd is determined, the position of the FEC codeword boundary in the downlink data stream may be determined based on the position of the Psync field. For example, corresponding to the downlink data frame structure in FIG. 3A, because a quantity of bits of the PSBd is fixed, an end position of the PSBd can be determined after the Psync field in the PSBd is determined. The end position of the PSBd is a start position of a first FEC codeword. Because a length of each FEC codeword in the downlink data frame (a quantity of data bits) is also fixed, a boundary position of each FEC codeword in the downlink data frame may also be determined based on the start position of the first FEC codeword.

After the boundary position of the FEC codeword in the downlink data frame is determined, the decoding check may be performed on the FEC codeword located after the PSBd, that is, the FEC codeword is decoded by using a decoder. In addition, whether the FEC codeword can be successfully decoded is determined according to an instruction of the decoder. In the downlink data frame, the correct FEC codeword can be determined only after the boundary of the FEC codeword is correctly determined. In this case, the FEC codeword can be successfully decoded. If the boundary of the FEC codeword is incorrectly determined, the correct FEC codeword cannot be determined, and an incorrect FEC codeword usually fails to be decoded. Therefore, by determining whether the FEC codeword can be successfully decoded, whether the determined boundary position of the FEC codeword is correct can be determined. The boundary position of the FEC codeword is determined based on the PSBd. Therefore, by determining whether the FEC codeword can be successfully decoded, whether the found PSBd is a correct PSBd can be determined.

405. If an FEC codeword among N consecutive FEC codewords in the data stream passes the decoding check, the optical network unit enters the synchronization state, where N is an integer greater than or equal to 1.

It should be understood that, because a case in which a bit error occurs in an FEC codeword in a downlink data frame may exist, some FEC codewords may fail to pass the decoding check. For example, when bit errors occur in a plurality of data bits in the first FEC codeword after the PSBd, the first FEC codeword may fail to pass the decoding check. However, for the second FEC codeword after the PSBd, when no bit error occurs in data bits or bit errors occur only in few data bits, the second FEC codeword may pass the decoding check.

Therefore, to avoid incorrectly determining that no correct PSBd is found due to a bit error in an FEC codeword, in this embodiment, whether to enter the synchronization state may be determined by determining whether any FEC codeword among the N consecutive FEC codewords in the downlink data stream passes the decoding check. If an FEC codeword among the N consecutive FEC codewords in the downlink data stream passes the decoding check, the optical network unit enters the synchronization state. For example, when N is 3, if an FEC codeword among three consecutive FEC codewords located after the PSBd in the downlink data stream passes the decoding check, the optical network unit enters the synchronization state. In other words, as long as any one of the first FEC codeword, the second FEC codeword, or the third FEC codeword located after the PSBd in the downlink data stream can pass the decoding check, the optical network unit can enter the synchronization state. Specifically, the optical network unit may enter the synchronization state after finding that an FEC codeword passes the decoding check, and does not need to wait to enter the synchronization state until the decoding check is performed on all the three FEC codewords and until it is found that an FEC codeword passes the decoding check. The synchronization state is a state in which the optical network unit performs normal data processing, that is, after entering the synchronization state, the optical network unit may parse the downlink data frame to obtain valid data transmitted in the downlink data frame.

It should be understood that the downlink data stream is obtained after scramble (Scramble) processing is performed, that is, the downlink data stream is obtained after an operation is performed on an original signal (for example, the downlink data stream is obtained after an operation is performed on the original signal by using a polynomial). Therefore, before performing FEC decoding, the optical network unit needs to descramble (Descramble) data. In a descrambling process, the optical network unit needs to use data content in the SFC. The SFC field itself has an error correction capability. As long as a quantity of bit errors in the SFC field is less than 2 bits (bits), the SFC can be restored correctly and used for descrambling the downlink data frame. Therefore, before performing FEC decoding, the optical network unit may perform descrambling on the downlink data stream based on the first field, and then perform FEC decoding.

In a possible implementation, the method 400 further includes if no FEC codeword among the N consecutive FEC codewords in the data stream passes the decoding check, the optical network unit returns to the search state from the pre-synchronization state, where N is an integer greater than or equal to 1. In other words, if no FEC codeword among the N consecutive FEC codewords in the data stream passes the decoding check, it may be considered that the optical network unit incorrectly enters the pre-synchronization state, and the optical network unit may return to the search state from the pre-synchronization state, and re-search for a matched Psync field and an SFC field.

N is a preset value, and is specifically an integer greater than or equal to 1, for example, may be 3 or 4. A value of N may be specifically set based on an actual situation, and is not specifically limited herein.

In this embodiment, the optical network unit determines whether to enter the pre-synchronization state by verifying the Psync and the SFC in the data stream, determines the position of the FEC codeword in the data stream after entering the pre-synchronization state, and enters the synchronization state when the FEC codeword passes the decoding check. Because a plurality of FEC codewords are included between any two Psyncs in the data stream, whether to enter the synchronization state is determined by determining whether the FEC codeword passes decoding. Therefore, it can take a relatively short time to enter the synchronization state, and efficiency of entering the synchronization state can be improved.

In a possible implementation, after the optical network unit finds that the FEC codeword among the N consecutive FEC codewords in the data stream passes the decoding check, the method 400 further includes the optical network unit determines, based on a position of the first field, an SFC field located after the first field in the data stream, and the optical network unit verifies the SFC field, and if a verification result of the SFC field is that SFC verification succeeds, the optical network unit enters the synchronization state. Because a length of each data frame in the downlink data stream is fixed, and a position of an SFC structure in each downlink data frame is also fixed, after the first field is determined, the SFC field located after the first field may be determined based on the position of the first field and the length of the downlink data frame, that is, a position of a next SFC structure is determined.

It should be noted that after the optical network unit verifies that the first field constitutes the valid SFC structure, the optical network unit locally stores an SFC value of the first field, and enters the pre-synchronization state. In this case, after the optical network unit enters the pre-synchronization state and before the optical network unit verifies the SFC field, the optical network unit performs an operation of adding 1 on the locally stored SFC value (in other words, adding 1 to the locally stored SFC value). Therefore, that the optical network unit verifies the SFC field specifically includes the optical network unit verifies whether the SFC field constitutes the valid SFC structure, and verifies whether an SFC value corresponding to the SFC field is equal to the locally stored SFC value. If the SFC field constitutes the valid SFC structure, and the SFC value corresponding to the SFC field is equal to the locally stored SFC value, it is determined that the verification result of the SFC field is that the SFC field constitutes the valid SFC structure.

Simply, after the optical network unit enters the pre-synchronization state, in addition to performing the FEC codeword decoding check on the data stream, the optical network unit further needs to perform SFC verification, and after the FEC codeword decoding check is passed and the SFC verification succeeds, the optical network unit enters the synchronization state from the pre-synchronization state. Therefore, by further verifying the SFC field on a basis of the FEC codeword decoding check, synchronization accuracy can be improved and a probability of incorrect synchronization can be reduced.

In a possible implementation, the method 400 further includes after the optical network unit enters the synchronization state, if none of M consecutive FEC codewords in the data stream passes the decoding check, the optical network unit transitions from the synchronization state to a re-synchronization state, where M is an integer greater than or equal to 1. In other words, after the optical network unit enters the synchronization state, if none of the M consecutive FEC codewords in the data stream passes the decoding check, the optical network unit may incorrectly enter the synchronization state. Therefore, in this case, the optical network unit can enter the re-synchronization state to perform synchronization again, that is, the re-synchronization state is a state used to perform synchronization again.

Conversely, after the optical network unit enters the synchronization state, if an FEC codeword among any M consecutive FEC codewords in the data stream passes the decoding check, the optical network unit remains in the synchronization state.

M is a preset value, and is specifically an integer greater than or equal to 1, for example, may be 3 or 4. A value of M may be specifically set based on an actual situation, and is not specifically limited herein. In a possible implementation, M may be equal to N.

It should be noted that, in a conventional technology, an optical network unit determines whether to remain in a synchronization state by verifying a Psync and an SFC in a downlink data stream. When a bit error rate is relatively high, the Psync and the SFC are prone to verification failure due to bit errors. Consequently, the optical network unit is likely to exit the synchronization state. In this embodiment, whether to remain in the synchronization state is determined by determining whether an FEC codeword among a plurality of consecutive FEC codewords in the data stream passes the decoding check. This can reduce a probability of incorrectly exiting the synchronization state, and prevent the optical network unit from frequently exiting the synchronization state.

In a possible implementation, if the optical network unit enters the re-synchronization state, the optical network unit may determine whether to return to the synchronization state from the re-synchronization state by continuing to perform the decoding check on the FEC codewords in the downlink data stream.

Specifically, the method 400 further includes after the optical network unit enters the re-synchronization state, the optical network unit performs the decoding check on the FEC codewords in the downlink data stream, and if an FEC codeword among S consecutive FEC codewords in the downlink data stream passes the decoding check, the optical network unit transitions from the re-synchronization state to the synchronization state, where S is an integer greater than or equal to 1. In other words, after the optical network unit enters the re-synchronization state, the optical network unit may determine whether to reenter the synchronization state by performing the decoding check on the FEC codewords in the data stream, thereby avoiding incorrectly exiting the synchronization state due to a bit error in the data stream.

S is a preset value, and is specifically an integer greater than or equal to 1, for example, may be 3 or 4. A value of S may be specifically set based on an actual situation, and is not specifically limited herein. In a possible implementation, S may be equal to N and/or M.

In a possible implementation, the method further includes after the optical network unit enters the re-synchronization state, if no FEC codeword among the S consecutive FEC from the re-synchronization state to the search state.

In other words, after the optical network unit enters the re-synchronization state, the optical network unit may determine to return to the synchronization state or to transition to the search state by continuing to perform the decoding check on the FEC codewords.

It may be understood that, after the optical network unit enters the synchronization state, if a bit error occurs in each of the M consecutive FEC codewords in the downlink data stream, the optical network unit may be caused to enter the re-synchronization state. In the re-synchronization state, the optical network unit may continue to perform the decoding check on the plurality of consecutive FEC codewords. If the FEC codeword decoding check is passed, it may be considered that the optical network unit incorrectly enters the re-synchronization state, therefore, the optical network unit returns to the synchronization state from the re-synchronization state. If the FEC codeword decoding check is not passed, it may be considered that the optical network unit incorrectly enters the synchronization state, therefore, the optical network unit transitions from the re-synchronization state to the search state.

Figure 5:
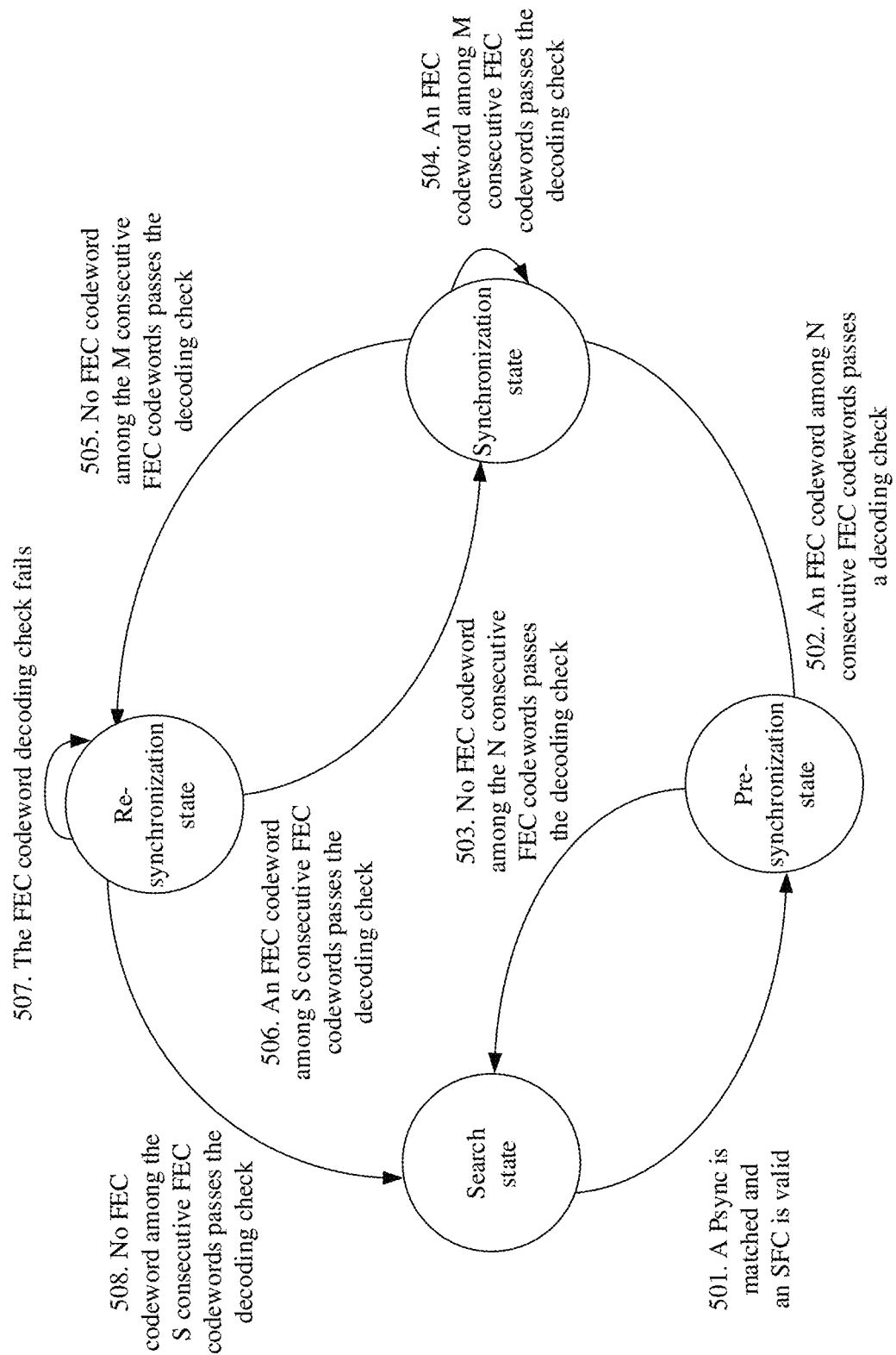
FIG. 5 is a schematic diagram of a process in which an optical network unit performs a state transition according to an embodiment of this application.

For ease of understanding, with reference to FIG. 5, the following describes in detail the data processing method provided in this embodiment. FIG. 5 is a schematic diagram of a process in which an optical network unit performs a state transition according to an embodiment of this application.

501. A Psync is matched and an SFC is valid.

When the optical network unit is in a search state (hunt state), the optical network unit searches a downlink data stream for a Psync field that matches a preset Psync. After the optical network unit finds the Psync field that matches the preset Psync, the optical network unit verifies whether a field located after the Psync can constitute a valid SFC structure. If the field located after the Psync field can constitute the valid SFC structure, it represents that the Psync in the downlink data stream is matched and that the SFC structure is valid, and the optical network unit transitions from the search state to a pre-synchronization state (pre-sync state).

502. An FEC codeword among N consecutive FEC codewords passes a decoding check, that is, the decoding check on at least one FEC codeword among the N consecutive FEC codewords succeeds.

When the optical network unit is in the pre-synchronization state, the optical network unit determines a boundary position of an FEC codeword in the downlink data stream based on the Psync field, and then performs the decoding check on the FEC codeword. If the FEC codeword among the N consecutive FEC codewords in the downlink data stream passes the decoding check, the optical network unit transitions from the pre-synchronization state to a synchronization state (sync state). N is an integer greater than or equal to 1.

503. No FEC codeword among the N consecutive FEC codewords passes the decoding check, that is, the decoding check on all the N consecutive FEC codewords fails.

When the optical network unit is in the pre-synchronization state, the optical network unit determines the boundary position of the FEC codeword in the downlink data stream based on the Psync field, and then performs the decoding check on the FEC codeword. If no FEC codeword among the N consecutive FEC codewords in the downlink data stream passes the decoding check, the optical network unit returns to the search state from the pre-synchronization state.

504. An FEC codeword among M consecutive FEC codewords passes the decoding check, that is, the decoding check on at least one FEC codeword among the M consecutive FEC codewords succeeds.

When the optical network unit is in the synchronization state, the optical network unit continuously performs the decoding check on the FEC codewords in the downlink data stream. If the FEC codeword among the M consecutive FEC codewords in the downlink data stream passes the decoding check, the optical network unit remains in the synchronization state. M is an integer greater than or equal to 1.

505. No FEC codeword among the M consecutive FEC codewords passes the decoding check, that is, the decoding check on all the M consecutive FEC codewords fails.

When the optical network unit is in the synchronization state, the optical network unit continuously performs the decoding check on the FEC codewords in the downlink data stream. If no FEC codeword among the M consecutive FEC codewords in the downlink data stream passes the decoding check, the optical network unit transitions from the synchronization state to a re-synchronization state (re-sync state).

506. An FEC codeword among S consecutive FEC codewords passes the decoding check, that is, the decoding check on at least one FEC codeword among the S consecutive FEC codewords succeeds.

When the optical network unit is in the re-synchronization state, the optical network unit continuously performs the decoding check on the FEC codewords in the downlink data stream. If the FEC codeword among the S consecutive FEC codewords in the downlink data stream passes the decoding check, the optical network unit transitions from the re-synchronization state to the synchronization state. M is an integer greater than or equal to 1.

507. The FEC codeword decoding check fails.

When the optical network unit is in the re-synchronization state, the optical network unit continuously performs the decoding check on the FEC codewords in the downlink data stream. When the optical network unit detects that the FEC codeword decoding check in the downlink data stream fails, and a quantity of FEC codewords checked by the optical network unit does not reach S, the optical network unit remains in the re-synchronization state, and continues to perform the decoding check on a next FEC codeword in the downlink data stream.

508. No FEC codeword among the S consecutive FEC codewords passes the decoding check, that is, the decoding check on none of the S consecutive FEC codewords succeeds.

When the optical network unit is in the re-synchronization state, the optical network unit continuously performs the decoding check on the FEC codewords in the downlink data stream. If no FEC codeword among the S consecutive FEC codewords in the downlink data stream passes the decoding check, the optical network unit transitions from the re-synchronization state to the search state.

All the foregoing embodiments may be applied to the downlink data frame structures shown in FIG. 3A and FIG. 3B. The following provides an embodiment of another data processing method for the downlink data frame structure shown in FIG. 3B.

Figure 6:
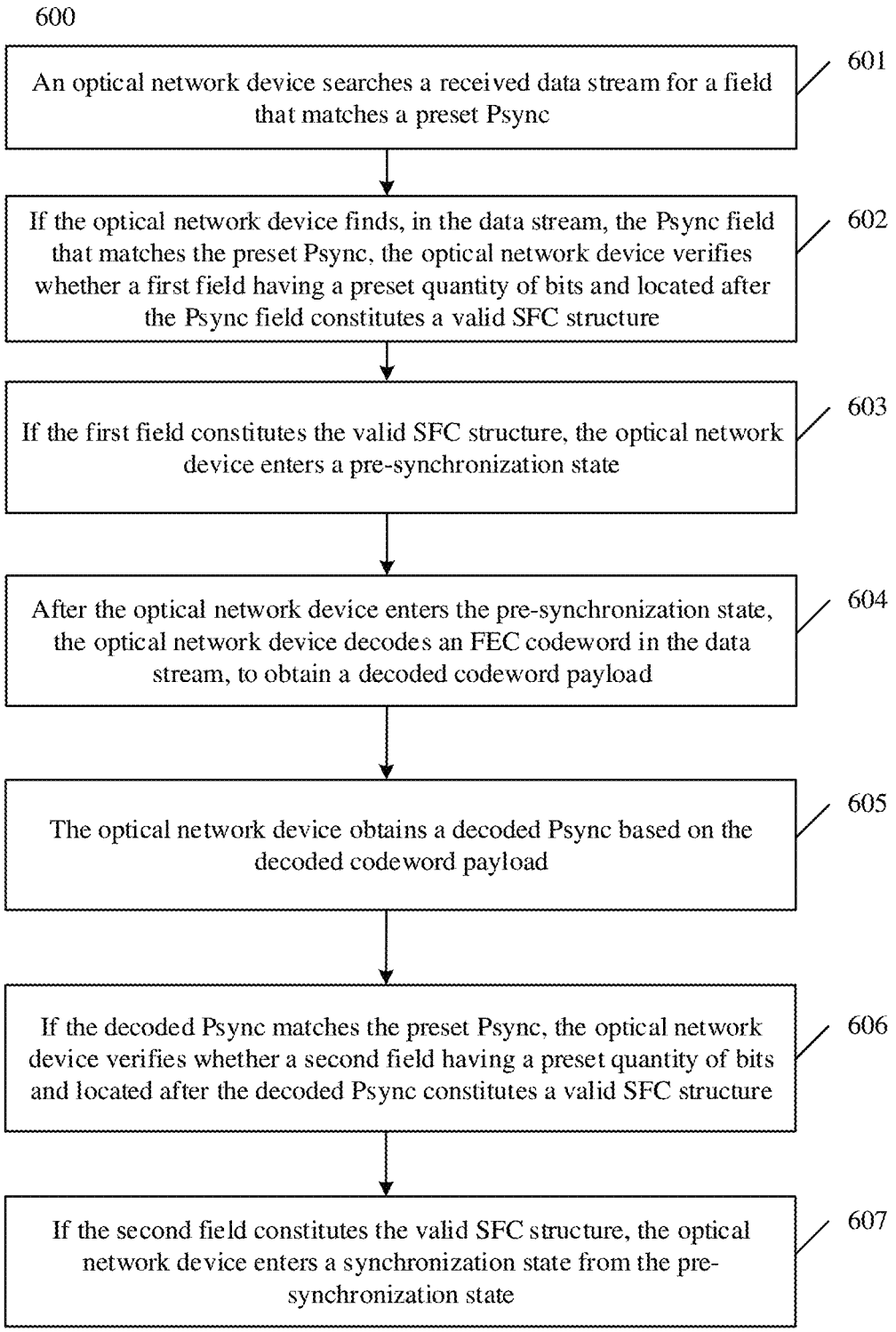
FIG. 6 is a schematic flowchart of a data processing method 600 according to an embodiment of this application.

FIG. 6 is a schematic flowchart of a data processing method 600 according to an embodiment of this application. As shown in FIG. 6, the data processing method 600 provided in this embodiment of this application includes the following steps.

601. An optical network unit searches a received data stream for a field that matches a preset Psync.

In this embodiment, step 601 is similar to the foregoing step 401. For details, refer to the description of step 401. Details are not described herein again.

602. If the optical network unit finds, in the data stream, the Psync field that matches the preset Psync, the optical network unit verifies whether a first field having a preset quantity of bits and located after the Psync field constitutes a valid SFC structure.

In this embodiment, step 602 is similar to the foregoing step 402. For details, refer to the description of step 402. Details are not described herein again.

603. If the first field constitutes the valid SFC structure, the optical network unit enters a pre-synchronization state.

In this embodiment, step 603 is similar to the foregoing step 403. For details, refer to the description of step 403. Details are not described herein again.

604. After the optical network unit enters the pre-synchronization state, the optical network unit decodes an FEC codeword in the data stream, to obtain a decoded codeword payload.

The decoded codeword payload refers to a valid data part of the FEC codeword obtained after the FEC codeword is decoded. It should be noted that, thanks to an error correction capability of the FEC codeword, when a bit error occurs in some data bits of the FEC codeword, for example, when a bit error occurs in one or two bits of data in the FEC codeword, the data bits in which the bit error occurs may be corrected in a decoding process of the FEC codeword. In this way, the bit error in the FEC codeword is corrected.

605. The optical network unit obtains a decoded Psync based on the decoded codeword payload, where the decoded Psync is located in the decoded codeword payload.

Because a PSBd is located in a first FEC codeword of a downlink data frame, after the FEC codeword is decoded to obtain the decoded codeword payload, the decoded Psync may be found based on the decoded codeword payload. Because decoding processing has been performed on the decoded Psync, and a data bit in which a bit error might occur in the Psync field has been corrected by an FEC decoder in the decoding process, a matching check is performed on the Psync, so that a matching success rate can be improved.

606. If the decoded Psync matches the preset Psync, the optical network unit verifies whether a second field having a preset quantity of bits and located after the decoded Psync constitutes a valid SFC structure.

After obtaining the decoded Psync, the optical network unit determines whether the decoded Psync matches the preset Psync. If the decoded Psync matches the preset Psync, the optical network unit continues to verify whether the second field having the preset quantity of bits and located after the decoded Psync constitutes the valid SFC structure. The second field may be a field having the preset quantity of bits and located after the decoded Psync field. For example, when an SFC is 64 bits, the second field may be, for example, a 64-bit field after the decoded Psync field. Simply, the quantity of bits of the second field is the same as a quantity of bits of the SFC.

607. If the second field constitutes the valid SFC structure, the optical network unit enters a synchronization state from the pre-synchronization state.

When the second field can constitute the valid SFC structure, the optical network unit enters the synchronization state from the pre-synchronization state.

In this embodiment, whether to enter the pre-synchronization state is determined by verifying the Psync and the SFC in the data stream, and after the pre-synchronization state is entered, whether to enter the synchronization state is determined by verifying the decoded Psync and the SFC. Because bit error correction may be implemented for the decoded Psync in the decoding process, the matching success rate of the Psync can be improved. Therefore, a probability that the optical network unit enters the synchronization state from the pre-synchronization state is increased, and difficulty for the optical network unit to enter the synchronization state due to a Psync bit error is avoided.

In a possible implementation, the method 600 further includes after the optical network unit enters the synchronization state, if a decoded Psync does not match the preset Psync or SFC verification fails, the optical network unit transitions from the synchronization state to a re-synchronization state, or if a decoded Psync matches the preset Psync and SFC verification succeeds, the optical network unit remains in the synchronization state.

In other words, after the optical network unit enters the synchronization state, the optical network unit continuously verifies the decoded Psync and the SFC in the downlink data stream. When the decoded Psync does not match the preset Psync or the SFC verification fails, the optical network unit transitions from the synchronization state to the re-synchronization state. When the decoded Psync does not match the preset Psync and the SFC verification succeeds, the optical network unit remains in the synchronization state.

In a possible implementation, the method 600 further includes after the optical network unit enters the re-synchronization state, for P consecutive data frames in the data stream, if a decoded Psync matches the preset Psync and SFC verification succeeds, the optical network unit transitions from the re-synchronization state to the synchronization state, where P is an integer greater than 1.

In other words, after the optical network unit enters the re-synchronization state, the optical network unit verifies the decoded Psync and the SFC in the downlink data stream, and in a plurality of consecutive downlink data frames in the downlink data stream, if a decoded Psync in a downlink data frame is matched and SFC verification succeeds, the optical network unit may transition from the re-synchronization state to the synchronization state.

In a possible implementation, the method 600 further includes after the optical network unit enters the re-synchronization state, for each of the P consecutive data frames in the data stream, if a decoded synchronization sequence does not match the preset Psync or SFC verification fails, the optical network unit transitions from the re-synchronization state to a search state.

In other words, after the optical network unit enters the re-synchronization state, the optical network unit verifies the decoded Psync and the SFC in the downlink data stream, and in a plurality of consecutive downlink data frames in the downlink data stream, if a decoded Psync in each downlink data frame is not matched or SFC verification fails, the optical network unit transitions from the re-synchronization state to the search state.

Figure 7:
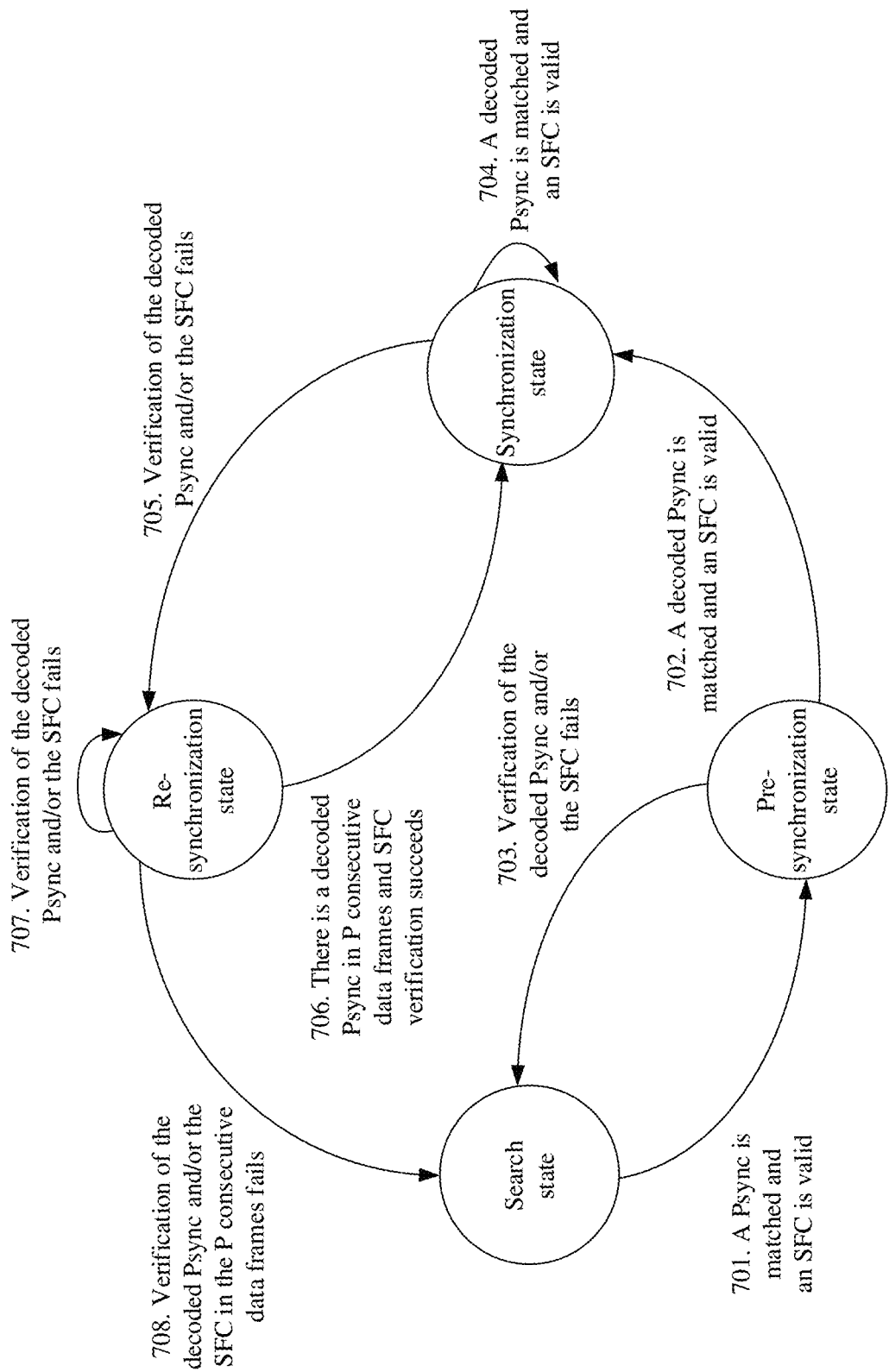
FIG. 7 is a schematic diagram of a process in which an optical network unit performs a state transition according to an embodiment of this application.

For ease of understanding, with reference to FIG. 7, the following describes in detail the data processing method provided in this embodiment. FIG. 7 is a schematic diagram of a process in which an optical network unit performs a state transition according to an embodiment of this application. The state transition process performed by the optical network unit shown in FIG. 7 may be applied to a scenario in which a downlink data frame has the data frame structure shown in FIG. 3B.

701. A Psync is matched and an SFC is valid.

When the optical network unit is in a search state (hunt state), the optical network unit searches a downlink data stream for a Psync field that matches a preset Psync. After the optical network unit finds the Psync field that matches the preset Psync, the optical network unit verifies whether a field located after the Psync can constitute a valid SFC structure. If the field located after the Psync field can constitute the valid SFC structure, it represents that the Psync in the downlink data stream is matched and that the SFC structure is valid, and the optical network unit transitions from the search state to a pre-synchronization state (pre-sync state).

702. A decoded Psync is matched and an SFC is valid.

When the optical network unit is in the pre-synchronization state, the optical network unit decodes an FEC codeword in the downlink data stream to obtain a decoded codeword payload, and obtains the decoded Psync based on the decoded codeword payload. After obtaining the decoded Psync, the optical network unit determines whether the decoded Psync matches the preset Psync. If the decoded Psync matches the preset Psync, the optical network unit continues to verify whether an SFC structure located after the decoded Psync is valid. When the decoded Psync matches the preset Psync and the SFC structure is valid, the optical network unit transitions from the pre-synchronization state to a synchronization state.

703. Verification of the decoded Psync and/or the SFC fails.

When the optical network unit is in the pre-synchronization state, the optical network unit decodes the FEC codeword in the downlink data stream to obtain the decoded codeword payload, and obtains the decoded Psync based on the decoded codeword payload. After obtaining the decoded Psync, the optical network unit determines whether the decoded Psync matches the preset Psync. If the decoded Psync matches the preset Psync, the optical network unit continues to verify whether the SFC structure located after the decoded Psync is valid. When the decoded Psync does not match the preset Psync, or the SFC structure is invalid (that is, verification of the decoded Psync and/or the SFC fails), the optical network unit returns to the search state from the pre-synchronization state.

704. A decoded Psync is matched and an SFC is valid.

When the optical network unit is in the synchronization state, the optical network unit continuously verifies the decoded Psync and the SFC in the downlink data stream. When the decoded Psync in the downlink data stream matches the preset Psync and the SFC structure is valid, the optical network unit remains in the synchronization state.

705. Verification of the decoded Psync and/or the SFC fails.

When the optical network unit is in the synchronization state, the optical network unit continuously verifies the decoded Psync and the SFC in the downlink data stream. When the decoded Psync in the downlink data stream does not match the preset Psync and/or the SFC structure is invalid, the optical network unit transitions from the synchronization state to a re-synchronization state.

706. There is a decoded Psync in P consecutive data frames and SFC verification succeeds.

When the optical network unit is in the re-synchronization state, the optical network unit continuously verifies the decoded Psync and the SFC in the downlink data stream. If a decoded Psync in one of the P consecutive downlink data frames in the downlink data stream is matched and SFC verification succeeds, the optical network unit may transition from the re-synchronization state to the synchronization state. P is an integer greater than or equal to 1.

707. Verification of the decoded Psync and/or the SFC fails.

When the optical network unit is in the re-synchronization state, the optical network unit verifies the decoded Psync and the SFC in the downlink data stream. When the optical network unit detects that verification of a decoded Psync and/or an SFC in a downlink data frame fails, and a quantity of downlink data frames checked by the optical network unit does not reach P, the optical network unit remains in the re-synchronization state, and continues to verify a decoded Psync and an SFC in a next downlink data frame in the downlink data stream.

708. Verification of the decoded Psync and/or the SFC in the P consecutive data frames fails.

When the optical network unit is in the re-synchronization state, the optical network unit verifies the decoded Psync and the SFC in the downlink data stream, and in a plurality of consecutive downlink data frames in the downlink data stream, if a decoded Psync in each downlink data frame is not matched or SFC verification fails, the optical network unit transitions from the re-synchronization state to the search state.

Figure 8:
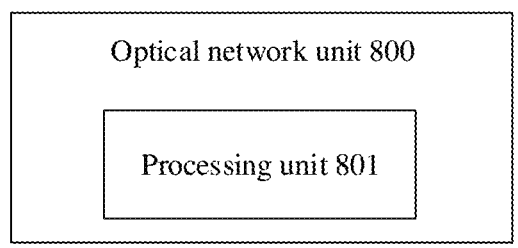
FIG. 8 is a schematic diagram of a structure of an optical network unit 800 according to an embodiment of this application.

FIG. 8 is a schematic diagram of a structure of an optical network unit 800 according to an embodiment of this application. The optical network unit 800 is configured to perform the process performed by a data receive end in the foregoing method embodiment. For example, the optical network unit may be applied to an optical network unit receiving a downlink data frame, or may be applied to an optical line terminal receiving an uplink data frame. For details about a specific execution process and beneficial effects, refer to the foregoing method embodiment.

An optical network unit 800 provided in an embodiment of this application includes a processing unit 801. The processing unit 801 is configured to search a received data stream for a field that matches a preset Psync, if the Psync field that matches the preset Psync is found in the data stream, verify whether a first field having a preset quantity of bits and located after the Psync field constitutes a valid SFC structure, if the first field constitutes the valid SFC structure, enter a pre-synchronization state, after entering the pre-synchronization state, determine a position of a forward error correction FEC codeword boundary in the data stream based on a position of a Psync field, and perform an FEC codeword decoding check, and if an FEC codeword among N consecutive FEC codewords in the data stream passes the decoding check, enter a synchronization state, where N is an integer greater than or equal to 1.

In a possible implementation, the processing unit 801 is further configured to determine, based on a position of the first field, an SFC field located after the first field in the data stream, and verify the SFC field, where a verification result of the SFC field is that the SFC field constitutes the valid SFC structure.

In a possible implementation, the processing unit 801 is further configured to if no FEC codeword among the N consecutive FEC codewords in the data stream passes the decoding check, return to a search state from the pre-synchronization state, where N is an integer greater than or equal to 1.

In a possible implementation, the processing unit 801 is further configured to after entering the synchronization state, if M consecutive FEC codewords in the data stream do not pass the decoding check, transition from the synchronization state to a re-synchronization state, or if an FEC codeword among M consecutive FEC codewords in the data stream passes the decoding check, remain in the synchronization state, where M is an integer greater than or equal to 1.

In a possible implementation, the processing unit 801 is further configured to after entering the re-synchronization state, if an FEC codeword among S consecutive FEC codewords in the data stream passes the decoding check, transition from the re-synchronization state to the synchronization state, where S is an integer greater than or equal to 1.

In a possible implementation, the processing unit 801 is further configured to after entering the re-synchronization state, if no FEC codeword among the S consecutive FEC codewords in the data stream passes the decoding check, transition from the re-synchronization state to a search state.

In a possible implementation, the processing unit 801 is further configured to decode an FEC codeword in the data stream to obtain a decoded codeword payload, obtain a decoded Psync based on the decoded codeword payload, where the decoded Psync is located in the decoded codeword payload, if the decoded Psync matches the preset Psync, verify whether a second field having a preset quantity of bits and located after the decoded Psync constitutes a valid SFC structure, and if the second field constitutes the valid SFC structure, enter the synchronization state from the pre-synchronization state, or remain in the synchronization state.

In a possible implementation, the processing unit 801 is further configured to after entering the synchronization state, if a decoded Psync does not match the preset Psync or SFC verification fails, transition from the synchronization state to a re-synchronization state, or if a decoded Psync matches the preset Psync and SFC verification succeeds, remain in the synchronization state.

In a possible implementation, the processing unit 801 is further configured to after entering the re-synchronization state, for P consecutive data frames in the data stream, if a decoded Psync matches the preset Psync and SFC verification succeeds, transition from the re-synchronization state to the synchronization state, where P is an integer greater than 1.

In a possible implementation, the processing unit 801 is further configured to after entering the re-synchronization state, for each of the P consecutive data frames in the data stream, if a decoded synchronization sequence does not match the preset Psync or SFC verification fails, transition from the re-synchronization state to a search state.

A person skilled in the art may clearly understand that, for the purpose of convenient and brief description, for detailed working processes of the foregoing system, apparatuses, and units, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory, a random access memory, a magnetic disk, or an optical disc.

What is claimed is:

1. A data processing method, comprising:
    entering, by a device, a pre-synchronization state when detecting, by the device, a physical synchronization sequence (Psync) field and a valid superframe counter (SFC) structure in a received data stream, wherein the Psync field is a field that matches a preset Psync;
    determining, by the device, a position of a forward error correction (FEC) codeword boundary in the received data stream;
    performing an FEC codeword decoding check; and
    entering, by the device, a synchronization state when an FEC codeword in the received data stream is decoded successfully.

2. The data processing method according to claim 1, further comprising:
    searching, by the device, the received data stream for the Psync field that matches the preset Psync;
    verifying, by the device, when the device finds, in the received data stream, the Psync field that matches the preset Psync, whether a first field having a preset quantity of bits and located after the Psync field constitutes the valid SFC structure; and
    entering, by the device, the pre-synchronization state when the first field constitutes the valid SFC structure.

3. The data processing method according to claim 1, wherein the entering, by the device, a synchronization state when an FEC codeword in the received data stream is decoded successfully comprises:
    entering, by the device, the synchronization state when the FEC codeword in the received data stream is decoded successfully and an SFC verification is successful.

4. The data processing method according to claim 1, further comprising:
    returning, by the device, after the device enters the pre-synchronization state, when no FEC codeword among N consecutive FEC codewords in the received data stream is decoded successfully, to a search state from the pre-synchronization state, wherein N is an integer greater than or equal to 1.

5. The data processing method according to claim 1, further comprising performing at least one of:
    transitioning, by the device, when a second FEC codeword in the received data stream fails to be decoded, from the synchronization state to a re-synchronization state after the device enters the synchronization state; or remaining, by the device, when a second FEC codeword in the received data stream is decoded successfully, in the synchronization state after entering the synchronization state.

6. The data processing method according to claim 5, further comprising:
transitioning, by the device, after the device enters the re-synchronization state, and when a third FEC codeword in the received data stream is decoded successfully, from the re-synchronization state to the synchronization state.

7. The data processing method according to claim 5, further comprising:
transitioning, by the device, after the device enters the re-synchronization state, and when no FEC codeword among S consecutive FEC codewords in the received data stream is decoded successfully, from the re-synchronization state to a search state, wherein S is an integer greater than or equal to 1.

8. The data processing method according to claim 1, further comprising performing at least one of:
transitioning, by the device, after the device enters the synchronization state, and when a decoded Psync does not match the preset Psync or when SFC verification fails, from the synchronization state to a re-synchronization state; or
remaining, by the device, when the decoded Psync matches the preset Psync and SFC verification succeeds, in the synchronization state after entering the synchronization state.

9. The data processing method according to claim 8, further comprising:
transitioning, by the device, when the decoded Psync matches the preset Psync and SFC verification succeeds, from the re-synchronization state to the synchronization state after the device enters the re-synchronization state.

10. The data processing method according to claim 8, further comprising:
transitioning, by the device, from the re-synchronization state to a search state after the device enters the re-synchronization state, for each of P consecutive data frames in the received data stream, when a decoded synchronization sequence does not match the preset Psync or SFC verification fails, wherein P is an integer greater than or equal to 1.

11. A device, comprising:
at least one processor; and
an interface coupled to the at least one processor, wherein the interface is configured to receive a data stream;
wherein the at least one processor is configured to:
enter a pre-synchronization state when detecting a physical synchronization sequence (Psync) field and a valid superframe counter (SFC) structure in the data stream, wherein the Psync field is a field that matches a preset Psync;
determine a position of a forward error correction (FEC) codeword boundary in the data stream;
perform an FEC codeword decoding check; and
enter a synchronization state when an FEC codeword in the data stream is decoded successfully.

12. The device according to claim 11, wherein the at least one processor is further configured to:
search the data stream for the field that matches the preset Psync;
verify, when finding, in the data stream, the Psync field match es the preset Psync, whether a first field having a preset quantity of bits and located after the Psync field constitutes the valid SFC structure; and
enter the pre-synchronization state when the first field constitutes the valid SFC structure.

13. The device according to claim 11, wherein the at least one processor is further configured to:
enter the synchronization state when the FEC codeword in the data stream is decoded successfully and an SFC verification is successful.

14. The device according to claim 11, wherein the at least one processor is configured to:
return to a search state from the pre-synchronization state when no FEC codeword among N consecutive FEC codewords in the data stream is decoded successfully, wherein N is an integer greater than or equal to 1.

15. The device according to claim 11, wherein the at least one processor is configured to perform at least one of:
transition, when a second FEC codeword in the data stream fails to be decoded, from the synchronization state to a re-synchronization state after entering the synchronization state; or
remain in the synchronization state when a second FEC codeword in the data stream is decoded successfully after entering the synchronization state.

16. The device according to claim 15, wherein the at least one processor is configured to:
transition, when a third FEC codeword in the data stream is decoded successfully, from the re-synchronization state to the synchronization state after entering the re-synchronization state.

17. The device according to claim 15, wherein the at least one processor is configured to:
transition, when no FEC codeword among S consecutive FEC codewords in the data stream is decoded successfully, from the re-synchronization state to a search state after entering the re-synchronization state, wherein S is an integer greater than or equal to 1.

18. The device according to claim 11, wherein the at least one processor is configured to perform at least one of:
transition, when at least one of a decoded Psync does not match the preset Psync or SFC verification failing, from the synchronization state to a re-synchronization state after entering the synchronization state; or
remain in the synchronization state when the decoded Psync matches the preset Psync and SFC verification succeeds after entering the synchronization state.

19. The device according to claim 18, wherein the at least one processor is configured to:
transition, when the decoded Psync matches the preset Psync and SFC verification succeeds, from the re-synchronization state to the synchronization state after entering the re-synchronization state.

20. A system, comprising:
a transmission device, configured to transmit a data stream; and
a receiving device, configured to:
receive the data stream;
enter a pre-synchronization state when detecting a physical synchronization sequence (Psync) field and a valid superframe counter (SFC) structure in the data stream, wherein the Psync field is a field that matches a preset Psync;

determine a position of a forward error correction (FEC) codeword boundary in the data stream;
perform an FEC codeword decoding check; and
enter a synchronization state when an FEC codeword in the data stream is decoded successfully.

* * * * *

UNITED STATES PATENT AND TRADEMARK OFFICE
CERTIFICATE OF CORRECTION

| | | |
|---|---|---|
| PATENT NO. | : 12,407,443 B2 | Page 1 of 1 |
| APPLICATION NO. | : 18/651185 | |
| DATED | : September 2, 2025 | |
| INVENTOR(S) | : Wu et al. | |

It is certified that error appears in the above-identified patent and that said Letters Patent is hereby corrected as shown below:

In the Specification

In Column 3, Line 50, after "consecutive FEC" insert -- codewords in the data stream passes the decoding check, the optical network unit transitions --.

In Column 14, Line 48, after "consecutive FEC" insert -- codewords in the data stream passes the decoding check, the optical network unit transitions --.

In the Claims

In Column 23, in Claim 12, Line 67, delete "match es" and insert -- matches --.

Signed and Sealed this
Fourth Day of November, 2025

John A. Squires
*Director of the United States Patent and Trademark Office*